United States Patent [19]

Biggs

[11] Patent Number: 5,323,448

[45] Date of Patent: Jun. 21, 1994

[54] SYSTEM FOR ACCESSING AMENITIES THROUGH A PUBLIC TELEPHONE NETWORK

[75] Inventor: Lawrence R. Biggs; Harry S. Budow, both of Plano, Tex.

[73] Assignee: Spectradyne, Inc., Richardson, Tex.

[21] Appl. No.: 29,851

[22] Filed: Mar. 11, 1993

Related U.S. Application Data

[63] Continuation of Ser. No. 640,070, Jan. 11, 1991, abandoned.

[51] Int. Cl.⁵ ......................................... H04M 11/00
[52] U.S. Cl. ..................................... 379/91; 379/105; 348/3; 348/16
[58] Field of Search ................................... 358/84–86; 379/91, 144, 114, 115, 155, 90, 105, 110

[56] References Cited

U.S. PATENT DOCUMENTS

| | | |
|---|---|---|
| 3,740,530 | 6/1973 | Hoffer et al. |
| 3,742,453 | 6/1973 | Poylo |
| 3,781,805 | 12/1973 | O'Neal, Jr. |
| 3,793,565 | 1/1974 | Smith |
| 3,846,622 | 11/1974 | Meyer |
| 3,920,908 | 11/1975 | Kraus ................................ 379/91 |
| 3,959,607 | 5/1976 | Vargo |
| 4,008,369 | 2/1977 | Theurer et al. |
| 4,439,636 | 3/1984 | Newkirk et al. ................... 379/144 |
| 4,595,983 | 6/1986 | Gehalo et al. ..................... 379/144 |
| 4,648,327 | 3/1987 | Toth et al. |
| 4,654,482 | 3/1987 | DeAngelis ......................... 379/91 |
| 4,672,661 | 6/1987 | Clark, Jr. et al. ................. 379/144 |
| 4,731,818 | 3/1988 | Clark, Jr. et al. ................. 379/144 |
| 4,750,201 | 6/1988 | Hodgson et al. .................. 379/91 |
| 4,763,191 | 8/1988 | Gordon ............................. 379/91 |
| 4,791,640 | 12/1988 | Sand ................................ 379/144 |
| 4,797,913 | 1/1989 | Kaplan et al. ..................... 379/91 |
| 4,803,348 | 2/1989 | Lohrey ............................. 379/91 |
| 4,818,854 | 4/1989 | Davies et al. |
| 4,847,890 | 7/1989 | Solomon et al. |
| 4,857,714 | 8/1989 | Sunyich |
| 4,860,336 | 8/1989 | D'Avello ......................... 379/91 |
| 4,860,341 | 8/1989 | D'Avello et al. ................. 379/91 |
| 4,868,846 | 9/1989 | Kemppi ............................ 379/144 |
| 4,883,948 | 9/1989 | Sunyich |
| 4,890,320 | 12/1989 | Monslow et al. |
| 4,920,562 | 4/1990 | Hird et al. |
| 4,935,956 | 6/1990 | Hellwarth et al. ................. 379/155 |
| 4,939,352 | 7/1990 | Sunyich |
| 4,949,187 | 8/1990 | Cohen |
| 4,969,183 | 11/1990 | Reese |
| 4,975,942 | 12/1990 | Zebryk ............................. 379/91 |

FOREIGN PATENT DOCUMENTS

| | | |
|---|---|---|
| 0342314A3 | 11/1989 | European Pat. Off. |
| 2184919 | 7/1987 | United Kingdom ............... 379/91 |
| 2219713A | 12/1989 | United Kingdom |
| 8702208 | 4/1987 | World Int. Prop. O. ........... 379/91 |

OTHER PUBLICATIONS

Advertisement for Gammon's Public Access Terminal, Teleconnect, pp. 105–106, Aug. 1989.
Proprietary Systems Inc. Brochure undated.

Primary Examiner—Wing F. Chan
Attorney, Agent, or Firm—David L. McCombs

[57] ABSTRACT

An amenity accessing system is provided that includes an access telephone (10) with a plurality of access keys. The telephone includes a line powered card reader (62) that interfaces with a CPU (60). Information stored in a memory (70) can then be output in response to a good card received by the card reader (62), this information being in the form of a calling string. The calling string is output to a switched network (22) and a store-and-forward switch (20). The store-and-forward switch (20) is operable to receive the calling string containing information as to the user's ID, credit card information, location of the access phone (10) and other relevant data. This billing information is validated at the store-and-forward switch (20) and, upon validation, an authorization code is then transmitted through a switched network (22) to one of various amenities (24)–(40). Billing information is then stored at the store-and-forward switch (20) and transmitted to various outclearing services through a storage media (44).

20 Claims, 6 Drawing Sheets

SYSTEM FOR ACCESSING AMENITIES THROUGH A PUBLIC TELEPHONE NETWORK

CROSS REFERENCE TO RELATED APPLICATION

This application is a continuation of U.S. patent application Ser. No. 07/640,070, entitled SYSTEM FOR ACCESSING AMENITIES THROUGH A PUBLIC TELEPHONE NETWORK, filed Jan. 11, 1991, now abandoned, assigned to the assignee of the present invention and incorporated herein by reference as if reproduced in its entirety.

TECHNICAL FIELD OF THE INVENTION

The present invention pertains in general to telephone systems, and more particularly, to a telephone system that has speed dial buttons and a billing information input device for accessing a plurality of amenities available through a central office switching device or carrier switch.

BACKGROUND OF THE INVENTION

Hotels and similar establishments operate in a relatively competitive business environment. As such, they always strive to obtain some leverage over their competitors. Other than utilizing competitive pricing structures, some establishments have chosen to offer various amenities as an attraction. These amenities can be in the form of free movies, in-room refreshment centers, vibrating beds, etc. However, one disadvantage to these types of systems is that, at present, most establishments control the billing for these amenities, and, therefore, they are required to maintain appropriate equipment on site or at some central location. For example, one amenity that is offered by most hotel establishments is pay-for-view television. A customer typically will call the front desk in the hotel and request that a particular program be authorized for his in-room television. When the program comes on at the designated time, it can be received by a decoder box on the customer's TV. This will then appear on the customer's bill when he checks out. However, this can typically result in problems, in that the customer sometimes denies that he requested it and, therefore, it does not get billed. The hotel therefore loses some income and, also, the firm that provides the actual amenity in the form of the movies also loses revenue.

One type of system that has been utilized to provide one amenity, long distance telephone calling, utilizes a credit card reader at the phone that automatically validates a customer's credit card before allowing the phone call to go through. This validation is done off site, away from the establishment, and the billing is completely independent of the establishment. Therefore, the customer is allowed to make long distance phone calls with his credit card without having it billed to the room. The establishment, therefore, does not have to maintain the billing system nor does it have to process the credit card transactions in order to collect for these long distance telephone calls. Rather, a separate service does the validation and the billing and, in some instances, provides some type of remuneration to the establishment in the form of a percentage of the profits.

SUMMARY OF THE INVENTION

The present invention disclosed and claimed herein comprises a system for accessing amenities from a telephone. The system includes a telephone having an input device. Telephone amenity i.d. information is stored in the telephone and then billing information from a user is input and stored in the telephone. In addition, amenity selection information is also input into the telephone to select an amenity having associated therewith selected stored identification information. The telephone is connected with a remote billing station in response to input of both the amenity selection information and the user billing information. This information is then translated to the remote billing station. At the remote billing station, the received billing information is validated to determine if it is acceptable. If it is acceptable, the telephone is connected to an amenity station corresponding to the received amenity identification information after validation of the billing information.

In another aspect of the present invention, the input device for receiving the billing information comprises a credit card reader for reading credit cards and extracting billing information therefrom. The credit card reader is powered from the telephone line by converting the power on the telephone line to a voltage appropriate for the credit card reader. The amenity selection information is input through a keypad wherein the depression of a single key associated with a particular amenity results in selection of associated identification information from the stored amenity identification information.

In yet a further aspect of the present invention, the remote billing station validates the received billing information by comparing it with a database of billing information. Once that validation is made, an authorization code associated with a particular amenity that corresponds to the received amenity identification information is transmitted to the corresponding amenity station through a telephone network. After acceptance by the amenity station of the authorization code, the call from the telephone to the remote billing station is then connected to the amenity station.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
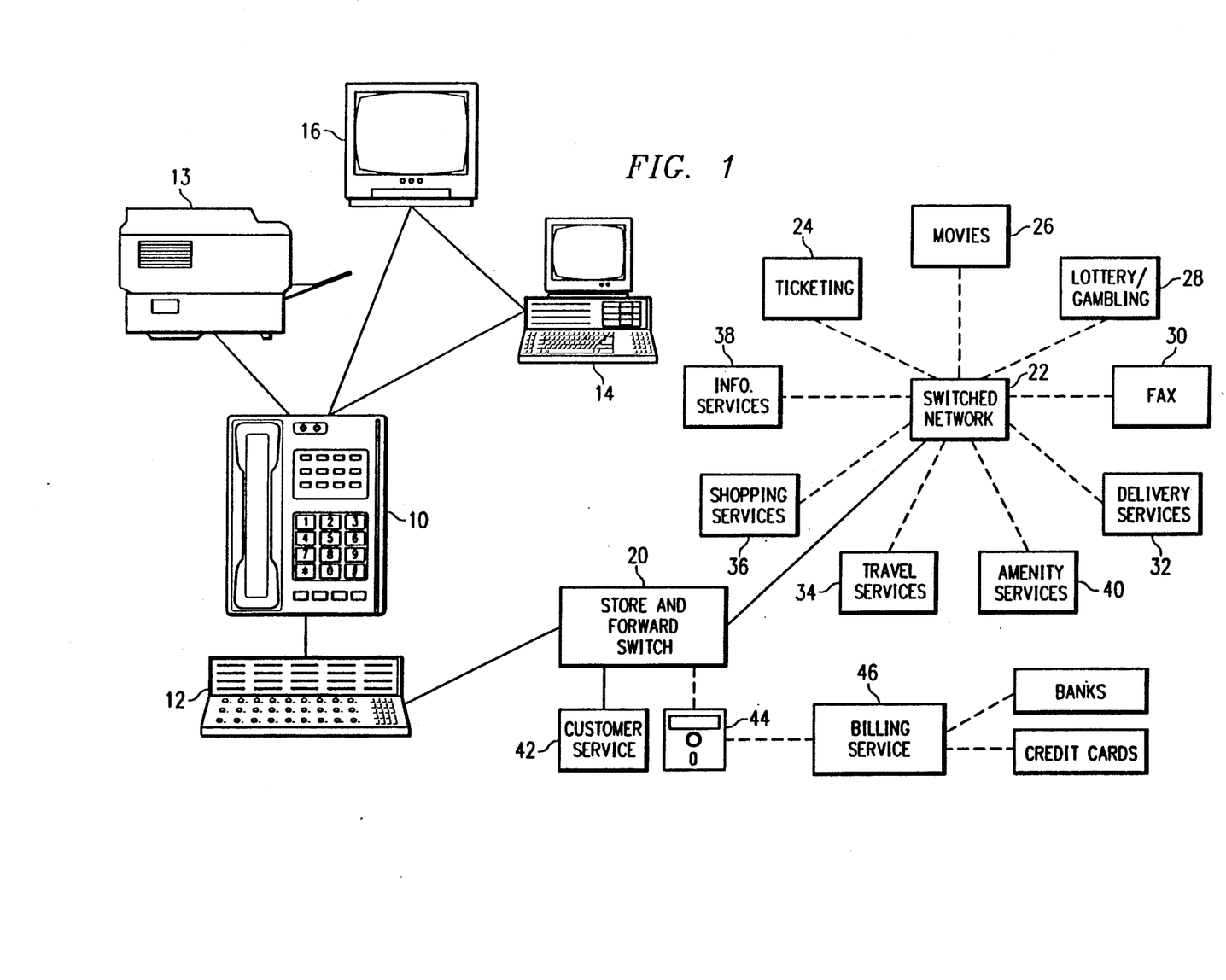
FIG. 1 illustrates a system diagram of the access system of the present invention.

Referring now to FIG. 1, there is illustrated a system diagram for the access system of the present invention. An access phone 10 is provided that is interconnected with an extension on a PBX 12. Although only one access phone 10 is illustrated, it should be understood that a plurality of access phones 10 are provided in a given establishment, such as a hotel. The access phone 10 can be interfaced with a FAX machine 12, a personal computer 14, or a television 16 such that information can be transmitted therefrom through the access phone 10. The PBX 12 has a plurality of trunk lines 18 connected to a store-and-forward switch 20. The store-and-forward switch 20, as will be described hereinbelow, basically comprises a device that can buffer a dialed phone number or call up pre-stored phone numbers, examine the dialed phone number and the associated data, such as authorization codes, and then forwards a call to a different number that was either dialed in or accessed from internal memory. Some features of the store-and-forward switch have been known with respect to autodialers.

The store-and-forward switch 20 is operable to receive information from the access phone 10 through the PBX 12 in the form of credit card information. This credit card information is recognized by the store-and-forward switch 20 and then a validation routine processed to validate the card number against a database. After validation, the information that was transmitted to the store-and-forward switch 20 with the credit card number, typically in the form of an amenity identification number, is utilized to determine the selected amenity. A prestored authorization code associated with the selected amenity is then sent to the selected amenity through the switched network 22 and, upon acknowledgement, the access phone 10 is then connected to the amenity. For example, a ticketing service 24 is provided, a movie service 26 is provided, a lottery/gambling service 28 provided, a FAX service 30 is provided, delivery services 32 are provided, travel services 35 are provided, shopping services 36 are provided, information services 38 are provided, and various other amenity services 40 are provided.

The store-and-forward switch 20 can receive the information from the access phone 10 in the form of a message that includes an origination number, a request for a specific service, the user's credit card number and expiration date, as well as other relevant data. Internal to the switch is stored specific routing information and action requirements that relate to each type of service requested. This information is utilized to make the connection between the access phone 10 and the various amenities on the switching network 22.

In the event that validation of the credit card is not achievable, the store-and-forward switch 20 defaults to a customer service operator 42 which then makes a voice connection with the user at the access phone 10. This allows manual validation of the card, in the event that the characters from the user's card were not read correctly. Further, an output tape or storage media 44 is provided which maintains the billing information. This billing information is a record that is maintained by the store-and-forward switch 20 for later forwarding to outclearing houses such as the billing service 46, that routes the information to the appropriate destination.

The system of the present invention is operable to provide a way for an establishment to provide for all the amenities through a telephone and facilitate the billing for the services at a remote location and by a separate entity. The establishment need only contract for the access phone 10 to be placed into a room and nothing else need be done. As will be described hereinbelow, the entire access phone 10 is "line-powered" such that additional power supplies and the such are not required. This will allow the access phone 10 to be plugged directly into the wall socket without requiring further hookup.

The entire billing procedure is performed at the store-and-forward switch 20 at the remote location and neither the amenities nor the establishment contracting for the access phone 10 have the responsibility for validation of the card or retaining billing information. The amenities will typically bill the operator of the system at the store-and-forward switch 20 for their services, this possibly having a volume discount associated therewith, and the operator of the system will then be responsible for collecting the money through the credit card services.

Figure 2:
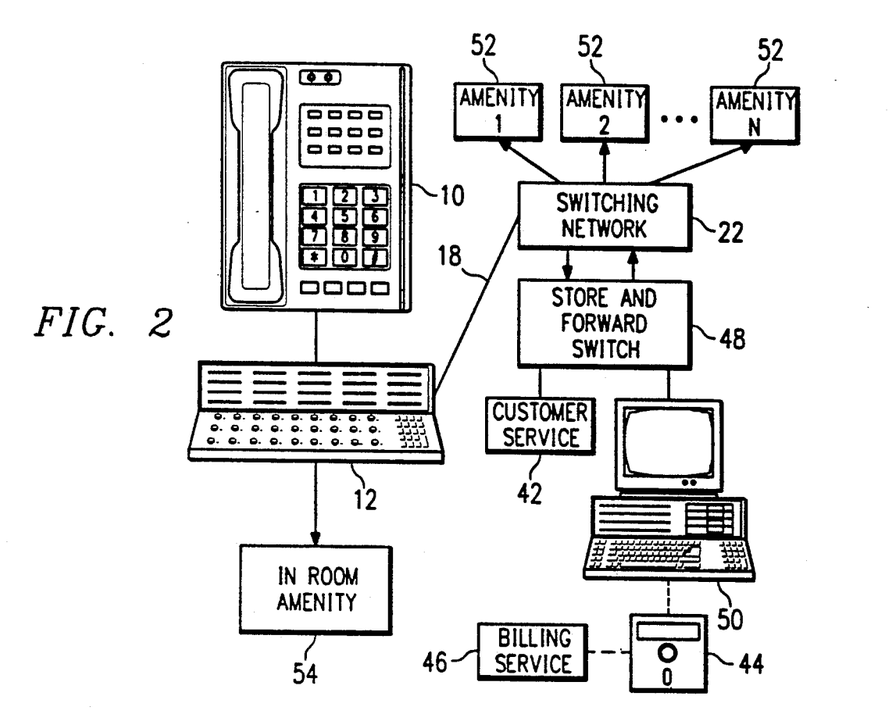
FIG. 2 illustrates an alternate embodiment of the system of FIG. 1, wherein the store-and-forward switch is disposed on the central office switching network.

Referring now to FIG. 2, there is illustrated a more detailed block diagram of an alternate embodiment wherein a store-and-forward switch 48, similar to the store-and-forward switch 20, is disposed on the switching network 22. In this mode, the access phone 10 accesses the switching network 22 through the PBX 12 and associated trunk line 18. A call is placed by the access phone 10 to a telephone number associated with the store-and-forward switch 48 in order to place a call thereto through the switching network 22. In this operation, the selection of an amenity by the access phone 10, as will be described hereinbelow, results in the telephone number of the store-and-forward switch being dialed out to the switching network 22. When a connection is made, the message is transmitted from the access phone 10 to the store-and-forward switch 48 in a similar manner to that described above with reference to FIG. 1. The store-and-forward switch 48 has associated therewith a computer 50 that has memory and various other peripheral units associated with a personal computer. The computer 50 has an operating program that allows the store-and-forward switch to be operated in accordance with the present invention. This allows the system to access various amenities 52 disposed on and accessible through the switching network, similar to amenities 24-40.

In one aspect of the present invention, there are some in-room amenities 54 that are provided, such as television, in-room refreshment centers, etc. The access phone 10 is a method by which the particular amenity can both be accessed indirectly and also a method by which the billing can be done outside of the establishment. In operation, the access phone 10 would allow the user to select the in-room amenity 54 and forward this information in association with his credit card information, room number and other relevant information to the store-and-forward switch 48. The store-and-forward switch 48 would validate the credit card number by accessing a separate database through a direct line and then go through a procedure to activate and monitor the in-room amenity 54. This can be done in a number of ways. First, a separate one of the amenities 52 could control the in-room amenity 54 and it would only then be necessary to call this amenity and route the access phone 10 to the amenity 52. The user at the access phone 10 would then input various key depressions in response to voice prompting from the amenity 52. This would allow the user to select, for example, a movie. The amenity 52 would then initiate activation of the in-room amenity 54. This could be done remotely by a call to the hotel establishment to activate the amenity, or some similar way.

Another method for activating an in-room amenity is that the store-and-forward switch 48 itself collects prompt information from the access phone 10 and then initiates a routine wherein it activates the in-room amenity 54 itself. For example, if the in-room amenity were a television that offered movies, a central distribution box could be located in the hotel establishment. The store-and-forward switch 48 could access this central distribution box through an extension on the PBX 12 and route the appropriate information therethrough. In this manner, the billing information, etc., is stored at the store-and-forward switch 48 through use of the computer 50 and then the in-room amenity 54 activated.

The access phone 10 when accessing any of the amenities, generates a calling string. As will be described hereinbelow, the calling string is comprised of the number of the store-and-forward switch 48, followed by an authorization code to inform the store-and-forward switch 48 as to the origination information of the phone, which is utilized to indicate to the store-and-forward switch 48 that the access phone 10 is authorized to operate on the system. Thereafter, relevant message information is transmitted indicating the amenity that is desired, what type of information is desired from the amenity, etc. Typically, the calling string is generated by a group of separate software macros, which macros can be assembled in any manner. For example, if a user wanted a facsimile to be sent to the hotel as part of the amenity, a macro would be incorporated into the software to generate message information providing information as to the user's location and a fax number at a destination location. Thereafter, when the call is connected to the amenity, this information is sent to the amenity in association with connection of the user's phone to that amenity.

Further, the macros could be assembled in the software to generate a message such that an amenity could be accessed with all of the pertinent information being transmitted to the amenity without the need to actually connect the user's access phone 10 to the amenity. This would be the situation where a user was ordering something like a newspaper. For example, if the user desired to have a newspaper delivered to his hotel room, this information could be programmed into the access phone 10 and associated with one of the key depressions. When the user depressed this key, the user's credit information in association with his authorization code would then be forwarded directly to the store-and-forward switch 48. Once validated, the following message information would contain everything necessary to be transmitted to the amenity by the store-and-forward switch 48 without need for the access phone 10 to actually be connected through the switching network to the amenity. This could also be the situation with a movie order wherein a user could merely depress a key dedicated for a given movie or in-room amenity 54. It is only necessary for the user of the access phone 10 to be connected to the amenity if the amenity requires further information other than a standard template of information. Therefore, in this mode, the access phone 10 is operable to generate a "packet" of information, which packet of information contains two types of routing information, routing information to the store-and-forward switch 48 and routing information to the amenity, and also billing information. This information is self-contained and accessible by the user by depression of a single button, which depression results in the assembling of the message packet for transmission to the amenity through the store-and-forward switch 48.

Figure 3:
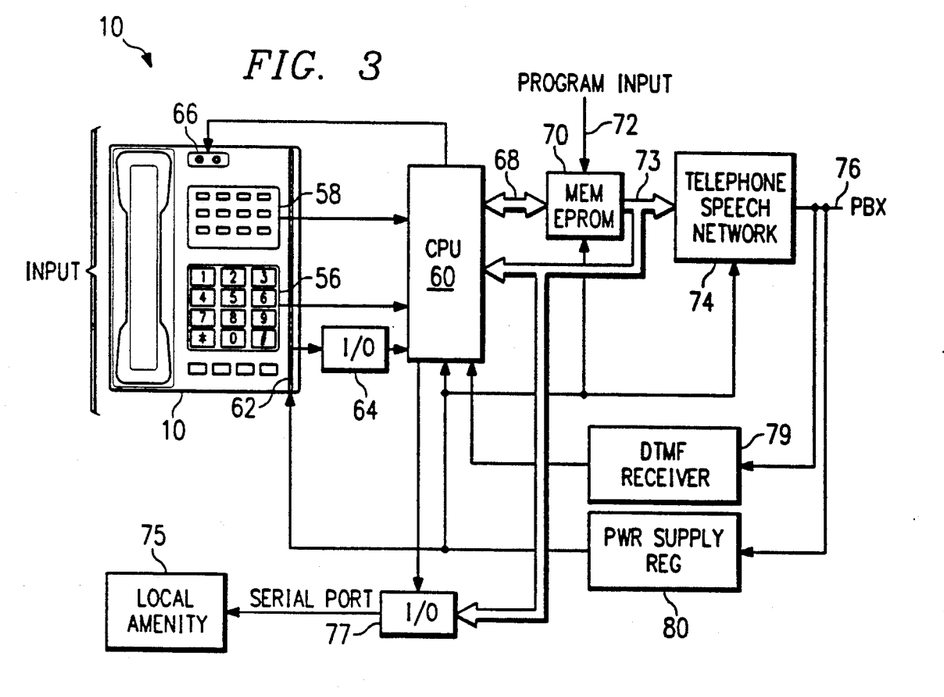
FIG. 3 illustrates a block diagram of the telephone unit that is connected to the PBX.

Referring now to FIG. 3, there is illustrated a schematic block diagram of the access phone 10. The access phone 10 includes a normal telephone keypad 56 having twelve buttons therefor. In addition, an amenity keypad 58 is provided that has a plurality of buttons, each button operable to select one amenity. A central processing unit 60 is provided which is a conventional microprocessor of the type G655C151 manufactured by SMD, which is operable to receive as inputs the amenity keypad 58 and the keypad 56. In addition, a card reader 62 is provided which is interfaced through an I/O device 64 to the CPU 60. The card reader 60 is the type MCR571, manufactured by Neuron Corporation, which is a low power card reader having a current requirement of approximately 3 ma. CPU 60 is operable to read the card reader when the card is swiped therethrough, and control the general operation thereof. The CPU 60 also controls a display device 66 which is essentially two Light Emitting Diodes (LED).

The CPU 60 is interfaced through a system bus 68 to a non-volatile memory 70. In the preferred embodiment, the memory is configured with an Erasable Programmable Memory (EPROM) of the type 27C256 which is a CMOS 32k×8 250 ns EPROM. The EPROM 70 contains the various programs and is programmable through a program input 72. The CPU 60 is operable to address predetermined locations in the memory for output on a data bus 73 to a telephone speech network 74 (balance network) which is essentially a device manufactured by Motorola Corporation under Part No. MC34014. The network 74 is operable to generate the DTMF signals for output to the PBX main line 76, which represents a four-line telephone access.

The CPU 60 also interfaces with a local amenity 75 through the data bus 73, which data bus is input through a I/O device 77 to provide a serial output port to the local amenity 75. The local amenity 75 is essentially an amenity that is located proximate to the access phone 10. The CPU 60 is operable to receive data from phone line 76 through a DTMF receiver 79, which has the output thereof connected to the CPU 60. The DTMF receiver 79 is operable to receive tones from a remote location through the phone line 76, decode the received tones and output serial data to the CPU 60, which data contains information that can be converted into data on the data bus 73 for output through the I/O 77 to the local amenity 75. Further, the data output of the DTMF receiver 76 could be directly connected through the I/O 77 and a serial port to the local amenity 75. This allows a remote location to directly communicate with the local amenity 75. Further, the DTMF receiver 79 allows acknowledgement tones and the like to be sent back to the CPU 60, thus providing a two-way communication link.

The four-line telephone line 76 has contained thereon the conventional forty-eight volt level provided by the telephone company. This is input to a power supply regulator circuit 80 to regulate the forty-eight volts down to a voltage of approximately twelve volts to provide a supply voltage. The regulator circuit is comprised in part of the speech network 74. This is input to the card reader 62, the CPU 60, the memory 70 and the telephone speech network 74. The overall access phone 10 draws approximately seventeen milliamps.

In operation, whenever the access phone 10 is taken off hook, this is sensed by the telephone speech network and the system is activated. A card can then be "swiped" through the card reader 62 and the CPU 60 will determine if it is a "good" card; that is, the card can be read by the card reader 62. If so, the display 66 is manipulated to indicate such. Once a good indication is obtained by the user, one of the amenity keys on the keypad 58 can be depressed. The CPU 60 senses this key depression and then outputs the appropriate calling string from the memory 70 to the telephone speech network. This is converted to the appropriate DTMF signals for output to the PBX 76. The calling string essentially has the telephone number of the store-and-forward switch and an associated message. The system then waits for connection with the amenity, as no further actions are taken by the access phone 10. If for some reason connection is not made to the amenity, a dial tone will be returned, or some similar type of tone. The access phone 10 is operable to receive acknowledgement tones from the store-and-forward switch which is utilized during transmission of the calling string, i.e., a pause is interposed between the dialed-out number of the store-and-forward switch, the transmission of user I.D. and authorization codes, and transmission of messages.

Figure 4:
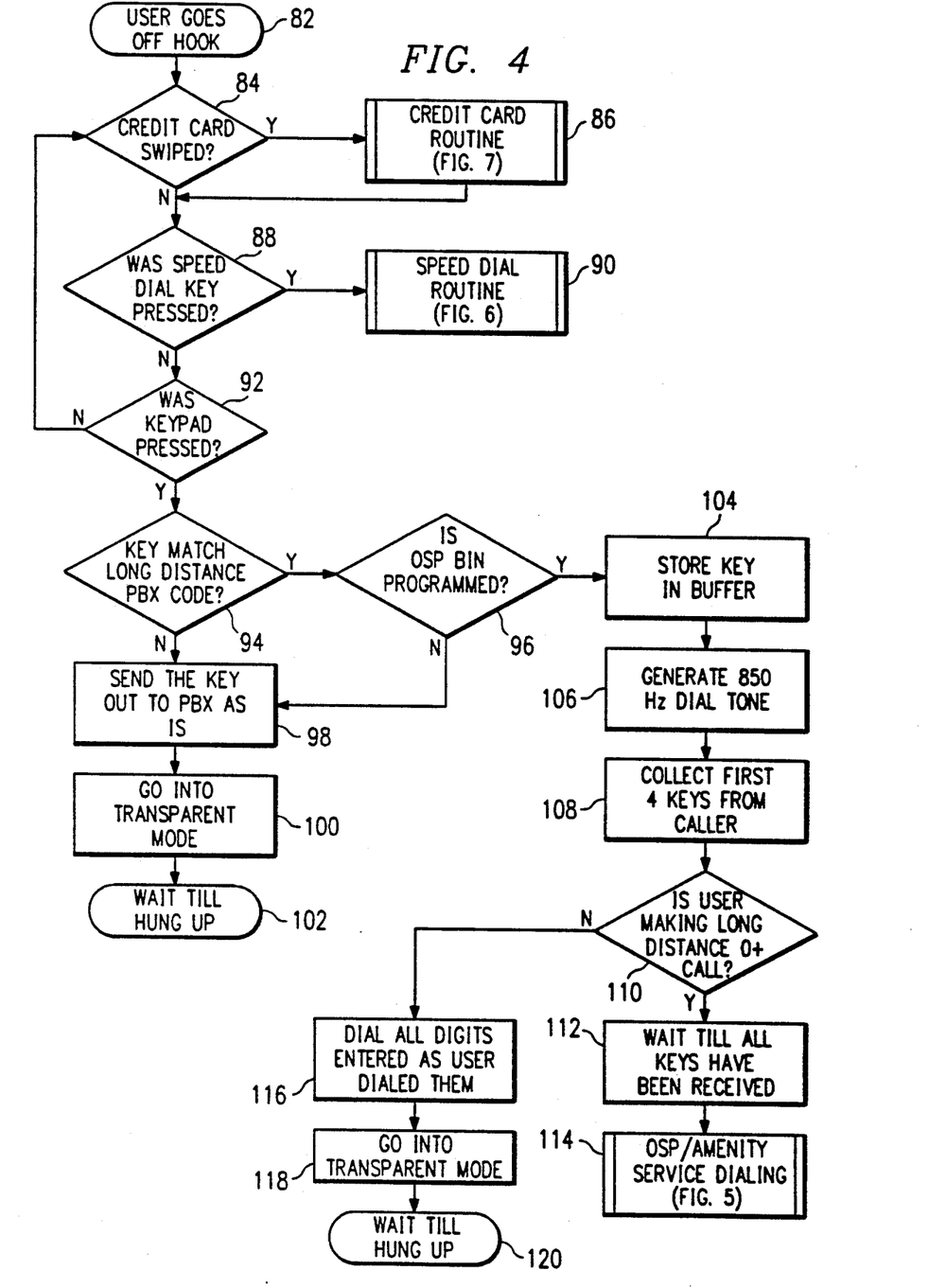
FIG. 4 illustrates a flow chart for the overall general operation of the phone.

Referring now to FIG. 4, there is illustrated a flow chart for the overall operation of the access phone 10. The program is initiated at a start block 82 wherein the user goes off hook. The program then flows to a decision block 84 to determine if the credit card has been swiped through the card reader. If yes, the program flows along a "Y" path to a function block 86 to initiate a credit card routine. If not, the program flows along an "N" path to the input of a decision block 88, the output of function block 86 also flowing to the input of decision block 88.

Decision block 88 determines whether a speed dial key has been pressed (the speed dial key being a standard feature). If the speed dial key has been pressed, the program flows along a "Y" path to a function block 90 that indicates a speed dial routine. The speed dial routine is one wherein a particular number has been predisposed in memory in accordance with the operation of a conventional phone. If the speed dial key has not been pressed, the program flows along the "N" path to decision block 92 to determine if the regular telephone keypad 56 has been depressed. If not, the program flows along an "N" path back to the decision block 84 and, if it was pressed, the program flows along a "Y" path to a decision block 94. Decision block 94 determines whether the key matches a long distance PBX code. If so, the program flows along a "Y" path to a decision block 96 to determine if the OSP buffer has been programmed. If it has not, the program flows along an "N" path to a function block 98 to send the key out to the PBX after it was pressed. The "N" path from the decision block 94 is also input to the function block 98. The program flows from the function block 98 into a function block 100 to go into a transparent mode and then to a block 102 to wait till the user goes back on hook.

If it was determined that the OSP buffer was programmed in decision block 96, the program would flow along a "Y" path to a function block 104 to store the key in a buffer. The program then flows to a function block 106 to generate a 350 Hz dial tone. The program then flows to a function block 108 to collect the first four keys from the caller and then flows to a decision block 110 to determine if the user is making a long distance 0+ call. If so, the program flows along a "Y" path to a function block 112 to wait until all the keys have been received, and then to a function block 114 representing the amenity service dialing routine, this being the selection of an amenity. However, if the user was not making a 0+ call, the program would flow along an "N" path from decision block 110 to a function block 116 to dial all the digits entered as the user dialed them and then to a function block 118 to go into a transparent mode. The program would then flow to a block 120 to wait until the user goes on hook.

Figure 5:
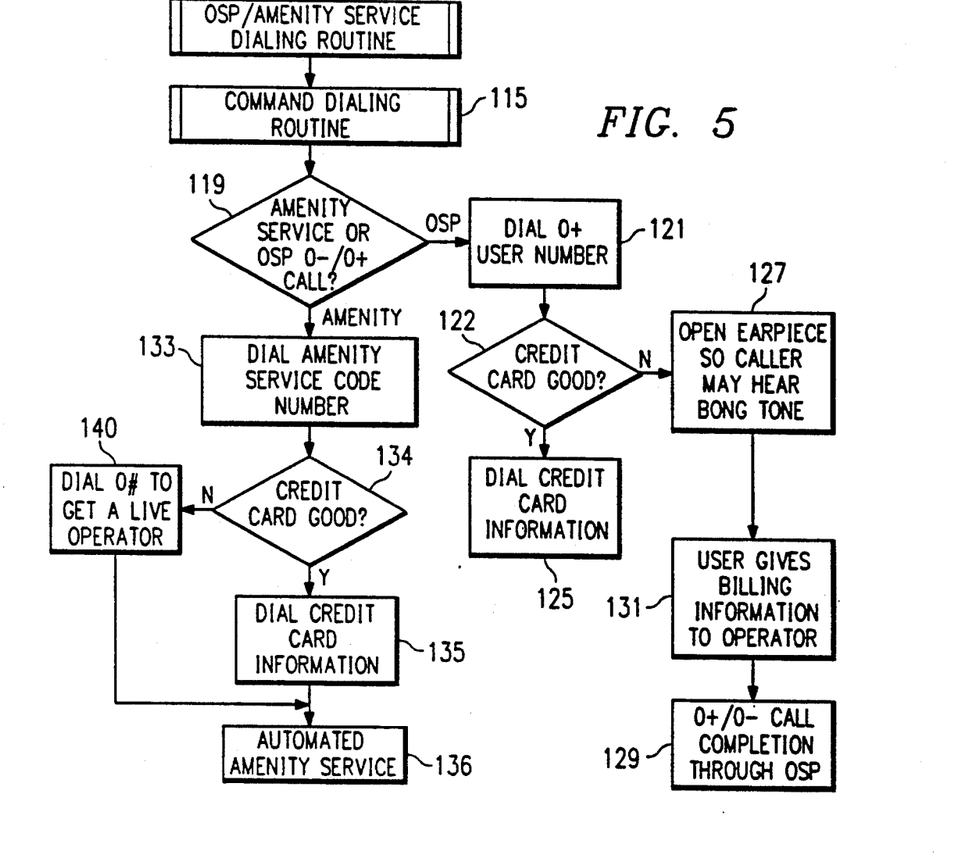
FIG. 5 illustrates a flow chart for the amenity service dialing routine.

Referring now to FIG. 5, there is illustrated a flow chart for the amenity dialing routine. The program would flow to a function block 115 to initiate a command dialing routine, which would create a calling string. The program would then flow to a decision block 119 to determine whether an amenity service or a 0−/0+ call was being made. If it is an OSP (Operator Service Provider) number, the program flows to function block 121 to dial a "0" followed by the user number. The program then flows to a function block 122 to determine if the credit card was good and, if so, the program flows along a "Y" path to a function block 125 and, if it was not good, the program flows along an "N" path to a function block 127 to open the earpiece so that the caller may hear a tone. After the credit card information is dialed in the function block 24, the program flows to a function block 129 wherein the call completion is made through the OSP. The function block 127 also flows to the function block 129 through a function block 131 wherein the user provides billing information to the operator.

If an amenity was selected by the decision block 119, the program would flow to function block 133 to dial the amenity service code number, which is a predetermined code associated with each amenity. The program would then flow to a decision block 134 to determine if the credit card was good. If so, the program flows along a "Y" path to a function block 135 to dial the credit card information and then to a function block 136 for the automated amenity service. If the credit card were not good, the program would flow from the decision block 134 along an "N" path to a function block 140 to obtain a live operator and then to the automated amenity service block 136.

Figure 6:
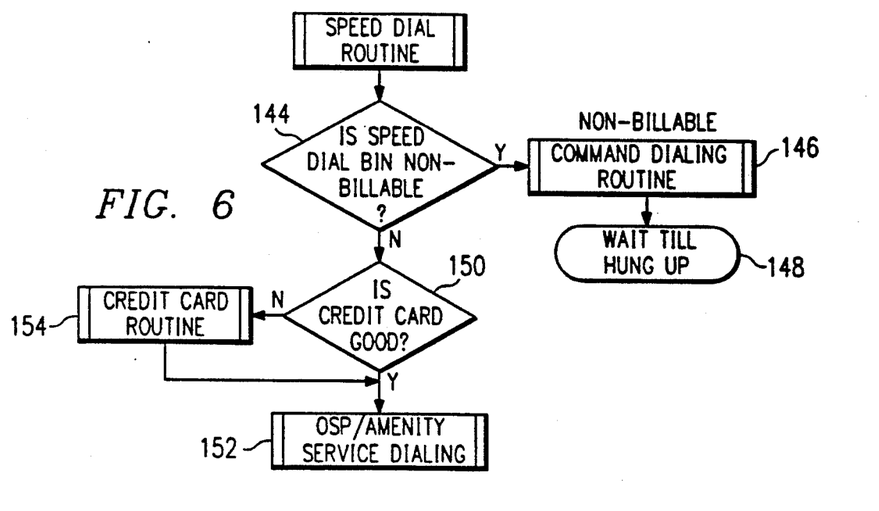
FIG. 6 illustrates a flow chart for the speed dial routine.

Referring now to FIG. 6, there is illustrated a flow chart depicting the speed dial routine. The program flows to a decision block 144 to determine if the speed dial buffer was non-billable. If it is, the program flows along a "Y" path to a function block 146 to initiate the dialing command routine and then to a block 148 to wait until the user has gone on hook. If the speed dial buffer is non-billable, the program flows along an "N" path to a decision block 150 to determine if the credit card is good. If so, the program flows along the "Y" path to a function block 152 to select the OSP amenity service dialing routine. If not, the program flows along an "N" path through a function block 152, which is a credit card routine, and then to the function block 152.

Figure 7:
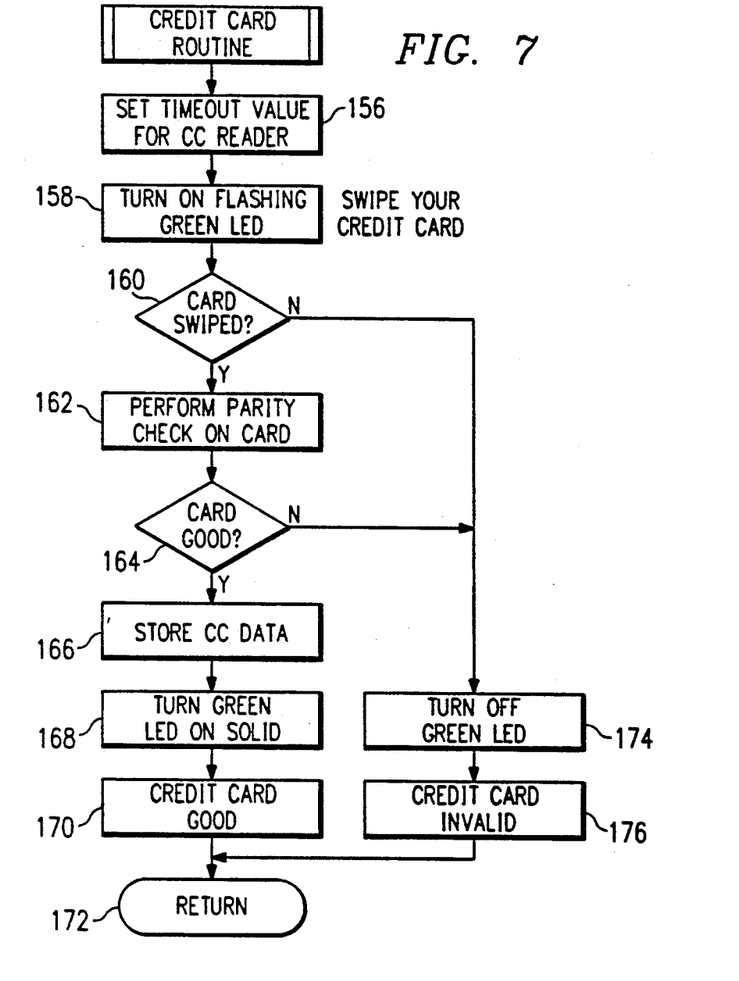
FIG. 7 illustrates a flow chart for the credit card routine for passing the credit card through the card reader.

Referring now to FIG. 7, there is illustrated a flow chart for the credit card routine. The program flows to a function block 86 to set a timeout value for the credit card reader. Once the timeout value has been set, the program flows to a function block 158 to turn on one of the LEDs in the display 66 that is a green color such that it flashes. This indicates to the user that he is to swipe his credit card through the credit card reader 62. The program then flows to a decision block 160 to determine if the card was swiped. If yes, the program flows to a function block 162 to perform a parity check on the card. The program then flows to a decision block 164 to determine if the card was good. If yes, the program flows along a "Y" path to a function block 166 to store the credit card data and then to a function block 168 to turn the green LED on to a solid color. The program then flows to a function block 170 to indicate that the credit card was good and then back to a return block 172.

If the card has not been swiped at decision block 168, the program flows along an "N" path to a function block 174 to turn off the green LED and then to a function block 176 to indicate that the credit card is not good, i.e., that it would not read properly. Then, the program flows to the return block 172. This is also the case if the credit card had been determined not to be good, wherein the program would flow from the decision block 164 along an "N" path to the input of function block 174.

Figure 8:
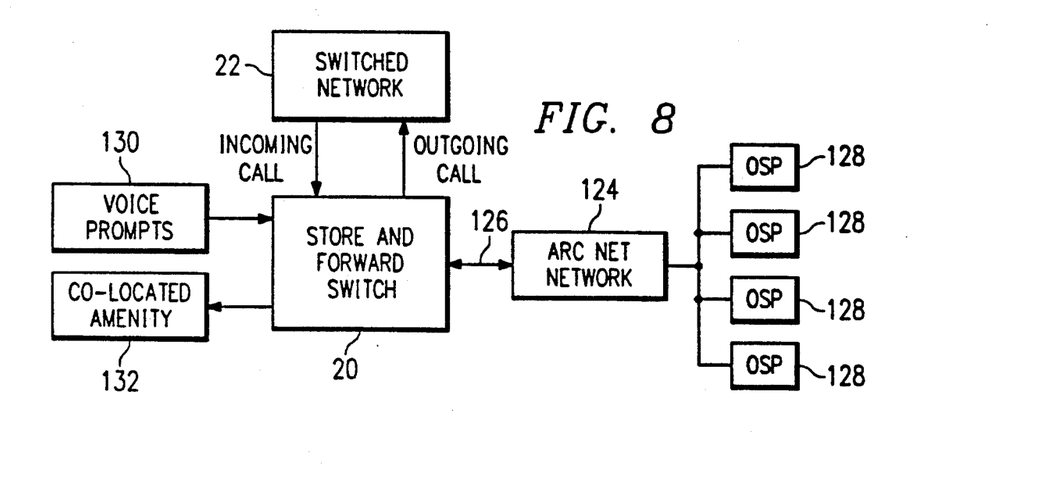
FIG. 8 illustrates a block diagram of the store-and-forward switch.

Referring now to FIG. 8, there is illustrated a block diagram of the store-and-forward switch 20. The store-and-forward switch 20 is operable to receive an incoming call from switched network 22 and also place an outgoing call from the switch 20 to switched network 22. The store-and-forward switch 20 has associated therewith and ARCNET network 124. The ARCNET network 124 is interfaced with the store-and-forward-switch 20 through a serial port 126. The network 124 is operable to interface a plurality of operator terminal 128 with the store-and-forward switch 20. This a conventional interconnection utilizing a local area network (LAN) in the form of the network 124.

The store-and-forward switch 20 also has interfaced therewith a voice prompt system 130. The voice prompt system 130 is essentially a Voice Messaging system that provides the capability to generate voice messages that are prerecorded in a digital form. In addition, a co-located amenity 132 is provided that is interfaced with the store-and-forward switch 20. This co-located amenity is identical in form to the amenities 52. The co-located amenity 132 allows the store-and-forward switch 20 to interface the amenity 132 through the switched network 22 directly with the access phone 10 without placing an outgoing call. In this manner, the call processing features of the store-and-forward switch 20 can be performed without placing an outgoing call but the co-located amenity 132 is still connected to the access phone 10, similar to that chart described above with reference to FIGS. 1 and 2.

Figure 9:
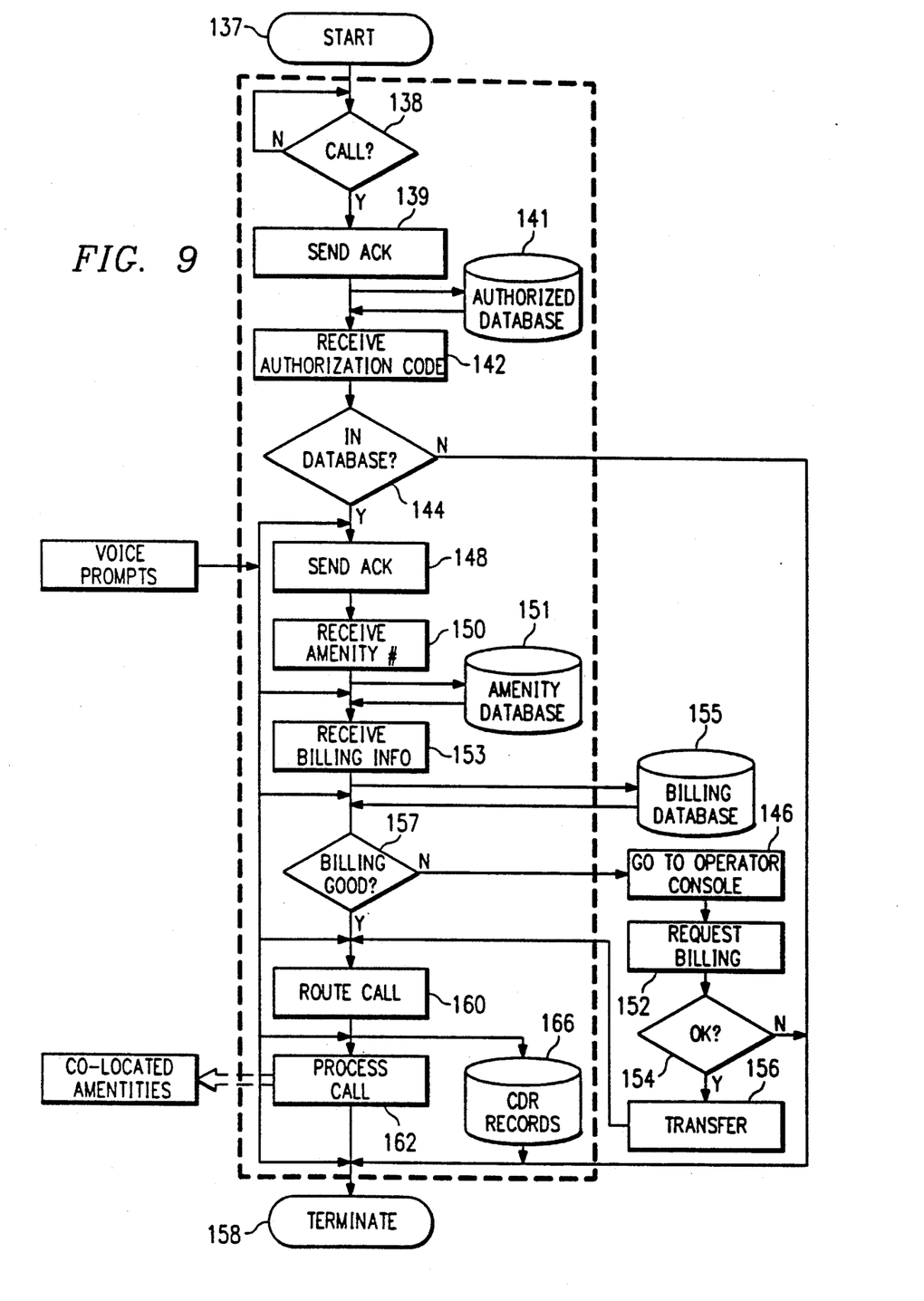
FIG. 9 illustrates a flow chart for the store-and-forward switch.

Referring now to FIG. 9, there is illustrated a flow chart for the operation of the store-and-forward switch 20. In general, the switch 20 has the operations thereof disposed within a phantom line box and is initiated at a start block 137. The program then flows to a decision block 138 to determine if a call has been made. If not, it returns to the input until the call has been received. When a call has been received, the program flows to a function block 139 to send an acknowledgement signal.

The program then flows to an authorized data base 141 which is accessed in order to determine whether an authorization code has been received. This is indicated by a function block 142 wherein the authorization code received from the access phone 10 is compared with the authorized database 140. If the authorization code is in the database, the program then flows along a "Y" path from a decision path 144. If the authorization code is not in the database, the program then flows along an "N" path to a termination block 158 to terminate the call.

If the authorization code is in the database, the program then flows along the "Y" path from the decision block 144 to a function block 148 to send a tone back to the unit. Voice prompts can also be returned to the access phone 10, which voice prompts were generated in the voice messaging system 130. The program then flows to a function block 150 to receive the amenity number.

After the amenity number has been received from the access phone 10, as indicated by the function block 150, an Amenity Database 151 is accessed for information regarding the amenity, such as routing information, processing information, etc. The program then flows to a function block 153 to receive the billing information after transmitting an acknowledgment tone to the access phone 10 that indicates receipt of the amenity number. A Billing Database 155 is accessed to validate the received billing information. Billing Database 151 is typically a direct line connection to a national clearinghouse that maintains a credit verification system. The program then flows to a decision block 157 to determine if the billing information was validated. If so, the program flows along a "Y" path to a function block 160 to route the call to the appropriate amenity. If the billing information was not validated, the program flows along the "N" path to a function block 146 to process billing information through the network 124 to request billing as indicated by function block 152 which, if approved by decision block 154, would result in transfer back to the input of function block 150 as indicated by function block 156. If not, the program would flow from the decision block 154 to a terminate block 158.

After the call has been routed, the store-and-forward switch 20 goes into a processing mode as indicated by a function block 162. The processing function interfaces with Call Data Records (CDR) in a database 166 to provide timing information, billing information, origination information (i.e., the location of the access phone 10 from which the call was originated), etc. This information is stored until the call is terminated. When the call is terminated, the program flows from the function block 162 to the terminate block 158. Further, when the call is processed, the function block 162 indicates that the store-and-forward switch 20 can interface with the co-located amenities 132 to maintain information associated therewith. As described above, the store-and-forward switch performs a number of functions. First, it must process and store the billing information, which information is approved during the reading process, as indicated by a function block 160. Once the call has been approved from a billing standpoint, the call is then routed to the amenity, the billing information stored and the call timed. Therefore, the operator of the amenity will provide the amenity and not maintain any information as to billing, timing, etc. This is controlled by the store-and-forward switch 20 of the present invention.

In summary, there has been provided a system that is operable to allow access between a phone system on a PBX and amenities disposed on a public switching network. A store-and-forward switch is provided off of the public switching network which is called by the telephone. Information is then transmitted from the telephone to the store-and-forward switch containing billing information regarding the particular user. This information is then validated and then the amenity contacted and authorized to provide the amenity to the user. Billing is maintained at the store-and-forward switch location, independent of both the amenity and the user.

Although the preferred embodiment has been described in detail, it should be understood that various changes, substitutions and alterations can be made therein without departing from the spirit and scope of the invention as defined by the appended claims.

What is claimed is:

1. Apparatus for processing billing information through a switched network telephone system for offering pay per view amenities to a user at an amenity device within a facility, the apparatus comprising:
   a telephone at said facility and connected to said switched network telephone system by a telephone line, said telephone for transmitting and receiving information on said line;
   a line powered card reader connected to said telephone for reading credit cards and extracting billing information therefrom;
   a power supply connected to said line and said card reader for converting power of said line to a power supply voltage with sufficient current to power said card reader;
   a processor connected to said card reader and said telephone for controlling said card reader to extract said billing information from said credit card and for transmitting said extracted billing information on said line;
   a billing computer connected to said telephone system for receiving and validating said transmitted billing information; and
   a central distribution computer located at said facility and connected without said switched network telephone system directly to said amenity device for facilitating the offer of a pay per view offering responsive to said billing computer validation.

2. A method of user access to movies at an amenity location, the method comprising:
   providing a central distribution computer connected to said amenity location for facilitating the offer of a movie;
   providing a central billing computer connected to said central distribution computer for validating said offer;
   providing a telephone connected to said central billing computer for user input to said central billing computer of user billing information and movie identification information, wherein said user input of billing and movie identification information through the telephone comprises:
      reading user credit card information with a card reader connected to said telephone;
      storing in said telephone said read credit card information;
      offering selectable movie identification information to said user, said movie identification information being stored in said telephone; and
      responsive to user selection of said offered movie identification information and said stored credit card information, connecting said telephone to said remote billing computer for validation;
   responsive to said user input, validating in said central billing computer said user billing information; and
   responsive to said validation, said billing computer instructing said central distribution computer to offer said movie at said amenity location.

3. The method of claim 2 further comprising:
   receiving power for said card reader from a line connected to said telephone; and
   converting said received power to a selected voltage for said card reader.

4. The method of claim 2 further comprising storing said user billing and movie identification information in said billing computer.

5. Apparatus for user access to movies at an amenity location, the apparatus comprising:
   a central distribution computer connected to said amenity location for facilitating the offer of a movie;
   a central billing computer connected to said central distribution computer for validating said offer;
   a telephone connected to said central billing computer for user input to said central billing computer of user billing information and movie identification information;
   a card reader connected to said telephone for reading user credit card information;
   data storage means in said telephone for storing said read credit card information;
   means connected to said telephone for offering selectable movie identification information to said user, said movie identification information being stored in said telephone;
   such that responsive to said user input, said central billing computer validates said user billing and movie identification information;
   such that responsive to said validation, said billing computer instructs said central distribution computer to offer said movie at said amenity location; and
   such that said telephone communicates with said remote billing computer for said validation responsive to user selection of said offered movie identification information and said stored credit card information.

6. The apparatus of claim 5 further comprising:
   means for receiving power for said card reader from a line connected to said telephone; and
   means for converting said received power to a selected voltage for said card reader.

7. The apparatus of claim 5 further comprising means for storing said user billing and movie identification information in said billing computer.

8. A method for user access to pay per view offerings at an amenity location, the method comprising:
   providing a central distribution computer connected to said amenity location for facilitating the offer to a pay per view offering;
   providing a central billing computer connected to said central distribution computer for validating said offer;
   providing a telephone connected to said central billing computer for user input to said central billing computer of user billing information and pay per view offering identification information, wherein said user input of billing and pay per view offering identification information through the telephone comprises:

reading user credit card information with a card reader connected to said telephone;

storing in said telephone said read credit card information;

offering selectable pay per view offering identification information to said user, said pay per view offering identification information being stored in said telephone;

responsive to user selection of said offered pay per view offering identification information and said stored credit card information, connecting said telephone to said remote billing computer for said validation;

responsive to said user input, validating in said central billing computer said user billing information; and responsive to said validation, said billing computer instructing said central distribution computer to offer said pay per view offering at said amenity location.

9. The method of claim 8 further comprising:

receiving power for said card reader from a line connected to said telephone; and converting said received power to a selected voltage for said card reader.

10. The method of claim 8 further comprising storing said user billing and pay per view offering identification information in said billing computer.

11. Apparatus for suer access to pay per view offerings at an amenity location, the apparatus comprising:

a central distribution computer connected to said amenity location for facilitating the offer of a pay per view offering;

a central billing computer connected to said central distribution computer for validating said offer;

a telephone connected to said central billing computer for user input to said central billing computer of user billing information and pay per view offering identification information;

a card reader connected to said telephone for reading user credit card information;

data storage means in said telephone for storing said read credit card information;

means connected to said telephone for offering selectable pay per view offering identification information to said user, said pay per view offering identification information being stored in said telephone;

responsive to said user input, said central billing computer validates said user billing and pay per view offering identification information;

responsive to said validation, said billing computer instructs said central distribution computer to offer said pay per view offering at said amenity location; and said telephone communicates with said remote billing computer for said validation responsive to user selection of said offered pay per view offering identification information and said stored credit card information.

12. The apparatus of claim 11 further comprising:

means for receiving power for said card reader from a line connected to said telephone; and means for converting said received power to a selected voltage for said card reader.

13. The apparatus of claim 11 further comprising means for storing said user billing and pay per view offering identification information in said billing computer.

14. A method for user access to pay per view offerings at an amenity location, the method comprising:

providing a central distribution computer connected to said amenity location for facilitating the offer of a pay per view offering;

providing a central billing computer for billing of said offer;

providing a telephone connected to said central billing computer for user input to said central billing computer of user billing information and pay per view offering identification information, wherein said user input of billing and pay per view offering identification information through the telephone comprises:

reading user credit card information with a card reader connected to said telephone;

storing in said telephone said read credit card information;

offering selectable pay per view offering identification information to said user, said pay per view offering identification information being stored in said telephone; and responsive to user selection of said offered pay per view offering identification information and said stored credit card information, connecting said telephone to said remote billing computer for said validation.

15. The method of claim 14 further comprising:

responsive to said user input, validating in said central billing computer said user billing information; and responsive to said validation, said billing computer instructing said central distribution computer to offer said pay per view offering at said amenity location.

16. Apparatus for user access to pay per view offerings at an amenity location, the apparatus comprising:

a central distribution computer connected to said amenity location for facilitating the offer of a pay per view offering;

a central billing computer for billing of said offer;

a telephone connected to said central billing computer for user input to said central billing computer of user billing information and pay per view offering identification information;

a card reader connected to said telephone for reading user credit card information;

data storage means in said telephone for storing said read credit card information; and means connected to said telephone for offering selectable pay per view offering identification information to said user, said pay per view offering identification information being stored in said telephone.

17. The apparatus of claim 16 wherein:

responsive to said user input, said central billing computer validates said user billing and pay per view offering identification information;

responsive to said validation, said billing computer instructs said central distribution computer to offer said pay per view offering at said amenity location; and said telephone communicates with said remote billing computer for said validation responsive to user selection of said offered pay per view offering identification information and said stored credit card information.

18. A method for user access to pay per view offerings at an amenity location within a facility, the method comprising:
- providing a central distribution computer within said facility, said central distribution computer being connected without a public switched network to said amenity location for offering a pay per view offering;
- providing a store and forward switch connected to said central distribution computer and providing a telephone connected to said store and forward switch, said store and forward switch receiving and storing from said telephone user billing information and pay per view offering identification information;
- responsive to said receiving and storing, said store and forward switch instructing said central distribution computer to offer a pay per view offering selected by said telephone user at said amenity location.

19. The method of claim 18 wherein said step of receiving and storing comprises:
- said telephone having stored therein user location information; and
- said telephone, responsive to user entry of billing information, forwarding both said billing information and said location information to said store and forward switch for receipt and storage thereof.

20. The method of claim 18 further comprising:
- providing a central billing service connected through a public switched network, for validating said billing information responsive to receipt thereof from said store and forward switch.

* * * * *